United States Patent
Hayes et al.

(10) Patent No.: US 11,620,656 B2
(45) Date of Patent: Apr. 4, 2023

(54) SYSTEM AND METHOD FOR PERSONALIZATION AS A SERVICE

(71) Applicant: GENESYS TELECOMMUNICATIONS LABORATORIES, INC., Daly City, CA (US)

(72) Inventors: Seamus Hayes, Galway (IE); Anthony Bates, Daly City, CA (US); Angelo Cicchitto, Vimercate (IT)

(*) Notice: Subject to any disclaimer, the term of this patent is extended or adjusted under 35 U.S.C. 154(b) by 0 days.

(21) Appl. No.: 17/241,673

(22) Filed: Apr. 27, 2021

(65) Prior Publication Data

US 2021/0334819 A1    Oct. 28, 2021

Related U.S. Application Data

(60) Provisional application No. 63/016,140, filed on Apr. 27, 2020.

(51) Int. Cl.
| | |
|---|---|
| G06Q 30/00 | (2012.01) |
| G06Q 30/02 | (2012.01) |
| G06F 21/62 | (2013.01) |
| H04M 3/523 | (2006.01) |

(Continued)

(52) U.S. Cl.
CPC ....... *G06Q 30/016* (2013.01); *G06F 21/6218* (2013.01); *G06Q 30/0201* (2013.01); *H04M 3/5232* (2013.01)

(58) Field of Classification Search
None
See application file for complete search history.

(56) References Cited

U.S. PATENT DOCUMENTS

| | | | | |
|---|---|---|---|---|
| 8,767,948 | B1 * | 7/2014 | Riahi | H04M 3/5175 |
| | | | | 379/266.01 |
| 9,955,012 | B2 * | 4/2018 | Stolyar | H04M 3/523 |
| 10,554,817 | B1 * | 2/2020 | Sullivan | H04L 41/5054 |

(Continued)

OTHER PUBLICATIONS

Kapsalis, Vassilis, et al. "A context-aware access control framework for e-service provision." 2005 IEEE International Conference on Industrial Technology. IEEE, (Year: 2005).*

(Continued)

*Primary Examiner* — Shelby A Turner

(57) ABSTRACT

A method related to customers orchestrating engagements with service providers. The method includes providing, by a facilitator entity, a customer journey orchestration service that includes: service providers affiliated with the customer journey orchestration service; a virtual datacenter in which cloud-based applications and databases are operably linked to communication devices of the customers and to the affiliated services providers; customer interface portals for enabling the customers to interact with the virtual datacenter, each customer interface portal being associated with a specific customer; and a customer profile database that stores customer profiles corresponding to respective ones of the customers. The method further includes configuring, by the facilitator entity, an account of the customer for participation in the customer journey orchestration service. The method further includes orchestrating, by the facilitator entity, a current engagement relating to a plurality of the preferred service providers.

11 Claims, 6 Drawing Sheets

(51) Int. Cl.
*G06Q 30/016* (2023.01)
*G06Q 30/0201* (2023.01)

(56) References Cited

U.S. PATENT DOCUMENTS

| | | | | |
|---|---|---|---|---|
| 2006/0241983 | A1* | 10/2006 | Viale | G06Q 10/02 |
| | | | | 705/5 |
| 2012/0331567 | A1* | 12/2012 | Shelton | G06Q 10/00 |
| | | | | 726/28 |
| 2015/0254679 | A1* | 9/2015 | te Booij | G06Q 30/0201 |
| | | | | 705/7.29 |
| 2017/0111503 | A1* | 4/2017 | McGann | H04M 3/5235 |
| 2017/0111505 | A1* | 4/2017 | McGann | H04M 3/5235 |
| 2017/0111509 | A1* | 4/2017 | McGann | H04M 3/5238 |
| 2017/0324868 | A1 | 11/2017 | Tamblyn et al. | |
| 2017/0359356 | A1* | 12/2017 | Brandwine | H04L 63/08 |
| 2018/0084111 | A1* | 3/2018 | Pirat | H04L 51/04 |
| 2019/0037077 | A1* | 1/2019 | Konig | H04M 3/527 |
| 2019/0347678 | A1 | 11/2019 | Eggers et al. | |

OTHER PUBLICATIONS

PCT International Search Report regarding application No. PCT/US2021/029490 dated Jul. 28, 2021.

* cited by examiner

SYSTEM AND METHOD FOR PERSONALIZATION AS A SERVICE

CROSS REFERENCE TO RELATED APPLICATION

This application claims the benefit of U.S. Provisional Patent Application No. 63/016,140, titled "SYSTEM AND METHOD FOR PERSONALIZATION AS A SERVICE", filed in the U.S. Patent and Trademark Office on Apr. 27, 2020, the contents of which are incorporated herein.

BACKGROUND

The present invention generally relates to contact center services, including customer journey orchestration. More particularly, but not by way of limitation, the present invention pertains to systems and methods for offering personalization as a service to customers interactions with contact center or service providers.

BRIEF DESCRIPTION OF THE INVENTION

A system and method are presented for an end customer to personally orchestrate their scheduled and active customer journeys with their service providers. The consumer can select to share information between a plurality of service providers, allowing events and notifications from one service provider to be consumed by another service provider. Artificial Intelligence (AI) methods can be applied to determine what segments of the journey orchestration should be exposed to the customer, such as through conversational AI services.

More specifically, in an embodiment, a method related to customers orchestrating engagements with service providers is provided. The method may include the step of providing, by an independent facilitator entity, a customer journey orchestration service. The customer journey orchestration service may include: a group of the service providers affiliated with the customer journey orchestration service; a virtual datacenter in which cloud-based applications and databases are operably linked to communication devices of the customers and to the group of affiliated services providers; customer interface portals for enabling the customers to access and interact with the virtual datacenter, each of the customer interface portals being associated with a specific one of the customers and accessed thereby by a corresponding one of the communication devices; and a customer profile database that stores customer profiles corresponding to respective ones of the customers. The method may further include the step of configuring, by the facilitator entity via a configuration process, an account of the customer for participation in the customer journey orchestration service. The configuration process, when described in relation to a first customer of the customers and a first communication device that corresponds to the first customer, may include: providing a first customer interface portal accessible by the first customer via the first communication device; creating a first customer profile in the customer profile database for storing customer data related to the first customer; receiving, from the first communication device via the first customer interface portal, customer data relating to the first customer; and creating a shared data model based on the received data sharing permissions that delineates an accessible portion of the customer data in the first customer profile that each of the preferred service providers is allowed to access and a restricted portion of the customer data in the first customer profile that each of the preferred service providers is prevented to access. The method may further include the step of orchestrating, by the facilitator entity via an orchestration process, a current and ongoing one of the engagements (hereinafter "current engagement") that relates to at least a plurality of the preferred service providers. The orchestration process, when described in relation to the first customer, may include: receiving data related to a first notification (hereinafter "first notification data") from a first preferred service provider, wherein the first notification data relates to the current engagement; updating the customer journey data stored in the first customer profile to include the first notification data; and in response to confirming that it is permitted by the shared data model, allowing a second preferred service provider access to the first notification data stored in the first customer profile.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
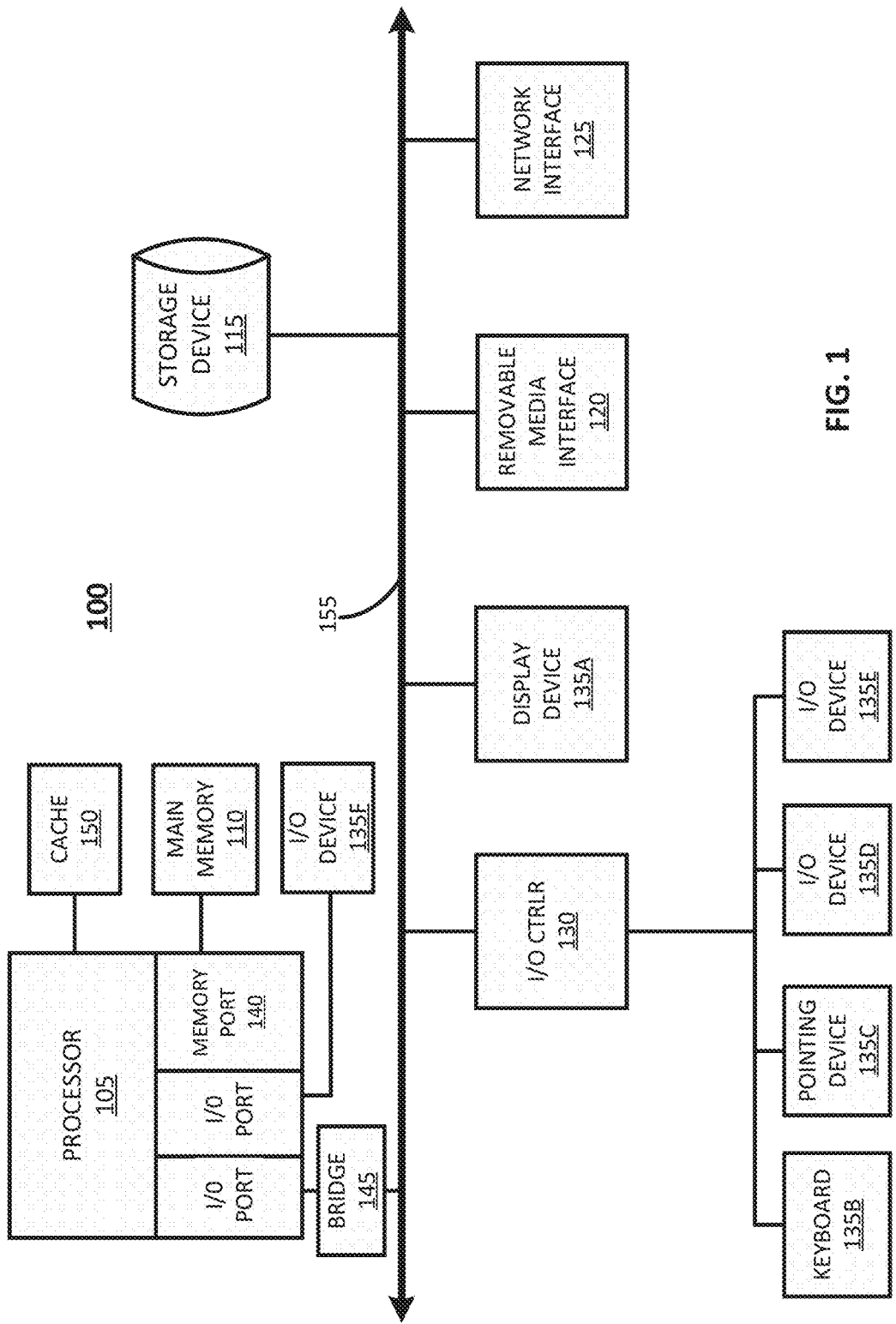
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Embodiments of the present invention may be implemented as an apparatus, method, or computer program product. Accordingly, example embodiments may take the form of an entirely hardware embodiment, an entirely software embodiment (including firmware, resident software, micro-code, etc.), or an embodiment combining software and hardware aspects. In each case, the example embodiment may be generally referred to as a "module" or "system" or "method". Further, example embodiments may take the form of a computer program product embodied in any tangible medium of expression having computer-usable program code embodied in the medium.

It will be further appreciated that the flowchart and block diagrams provided in the figures illustrate architecture, functionality, and operation of possible implementations of systems, methods, and computer program products according to example embodiments of the present invention. In this regard, each block in the flowchart or block diagrams may represent a module, segment, or portion of code, which comprises one or more executable instructions for implementing the specified logical functions. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Turning now to the figures, exemplary methods and systems will be discussed. As will be appreciated, these include examples of enabling technology for achieving the functionality claimed in the appended claims as well as example embodiments of the present invention, such as, for example, the embodiments discussed in relation to FIGS. 8 and 9.

With specific reference now to FIG. 1, a schematic block diagram of an exemplary computing device 100 is shown in accordance with embodiments of the present invention and/or with which exemplary embodiments of the present invention may be enabled or practiced. Those skilled in the art will recognize that the various systems and methods disclosed herein may be computer implemented using many different forms of data processing equipment, for example, digital microprocessors and associated memory executing appropriate software programs. It should therefore be appreciated that FIG. 1 is provided as a non-limiting example.

The computing device 100 may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. For example, the various servers may be a process or thread running on one or more processors of one or more computing devices 100, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2—the various servers and computer devices thereof may be located on local computing devices 100 (i.e., on-site at the same physical location as the agents of the contact center), remote computing devices 100 (i.e., off-site or in a cloud-based or cloud computing environment, for example, in a remote data center connected via a network), or some combination thereof. In exemplary embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, or the like.

As shown in the illustrated example, the computing device 100 may include a central processing unit (CPU) or processor 105 and a main memory 110. The computing device 100 may also include a storage device 115, removable media interface 120, network interface 125, and one or more input/output (I/O) devices 135, which as depicted may include an I/O controller 130, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system and software that run on the computing device 100. The operating system may control scheduling tasks and access to system resources. Unless otherwise limited, the operating system and software may include any capable of performing the operations described herein, as would be appreciated by one of ordinary skill in the art.

As shown in the illustrated example, the computing device 100A may include a wide variety of I/O devices 135. As shown, a I/O controller 130 may be used to control one or more I/O devices. As shown, Input devices may include the keyboard 135B and pointing device 135C, which, for example, may be a mouse or optical pen. Output devices, for example, may include video display devices, speakers and printers. The I/O devices 135 and/or the I/O controller 130 may include suitable hardware and/or software for enabling for the use of multiple display devices. The computing device 100 may also support one or more removable media interfaces 120, such as a disk drive, USB port, or any other device suitable for reading data from or writing data to any type of computer readable media. The removable media interface 120, for example, may be used for installing software and programs.

The computing device 100 may be any workstation, desktop computer, laptop or notebook computer, server machine, virtual device, mobile telephone, smart phone, portable telecommunication device, media playing device, gaming system, mobile computing device, or any other type of computing, telecommunications or media device, without limitation, capable of performing the operations described herein. The computing device 100 may have several input devices with each having different processors and operating systems. The computing device 100 may include a mobile device that combines several devices, such as a mobile phone having a digital audio player or portable media player.

The computing device 100 may be one of a plurality of devices connected by a network or connect to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. As an example, a local machine may have the capacity to function as both a client node seeking access to resources provided by a server and as a server providing access to hosted resources for other clients. The network may be LAN or WAN links, broadband connections, wireless connections, or some combination thereof, with connections being established using appropriate communication protocols. The computing device 100 may communicate with other computing devices 100 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization are also contemplated, such as, for example, the network (e.g., via software defined networking) or functions (e.g., via network functions virtualization).

Figure 2:
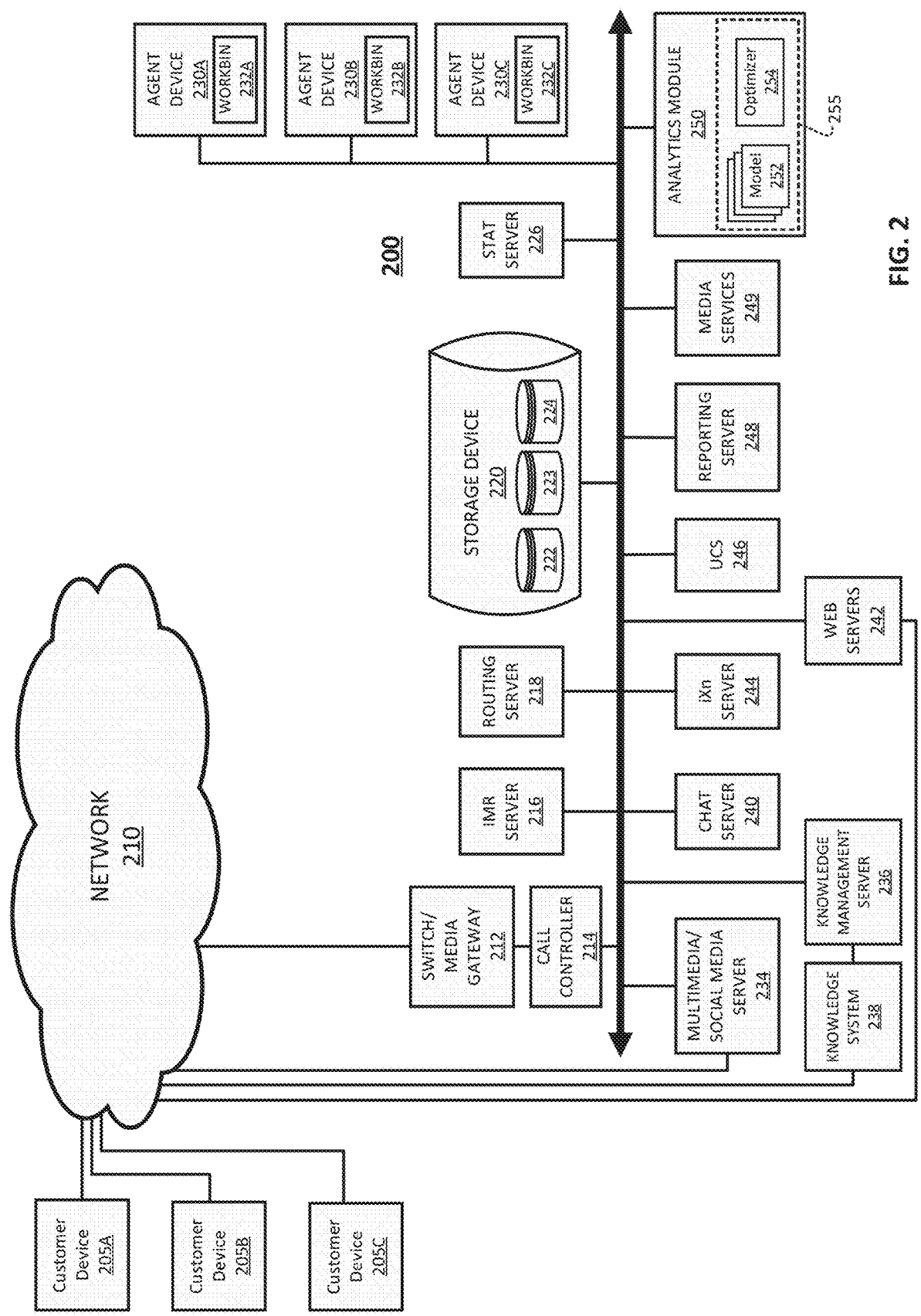
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Figure 3:
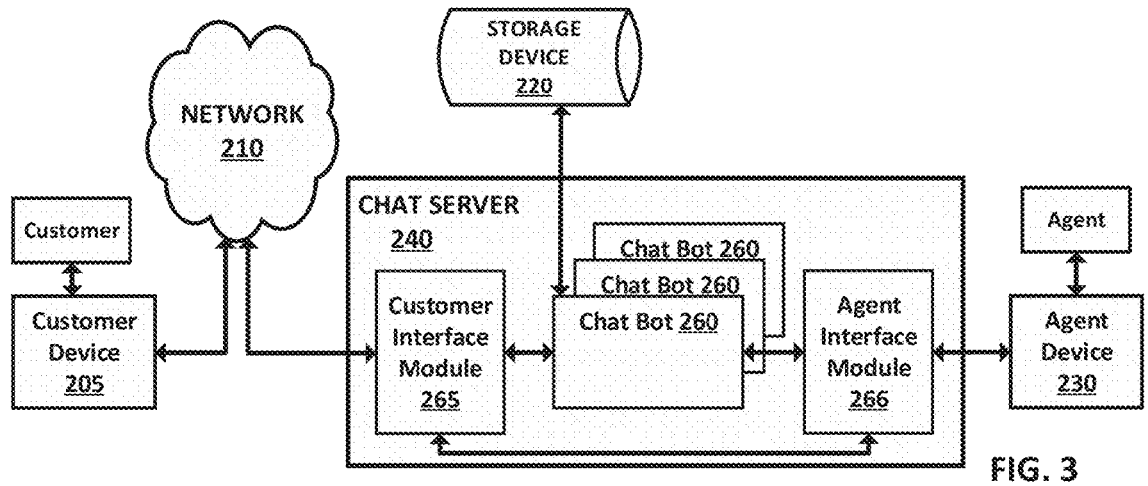
FIG. 3 is schematic block diagram showing further details of a chat server operating as part of the chat system according to embodiments of the present invention.
Figure 4:
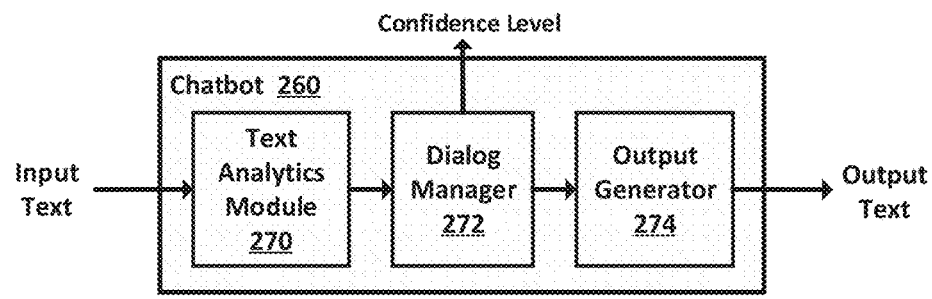
FIG. 4 is a schematic block diagram of a chat module according to embodiments of the present invention.
Figure 5:
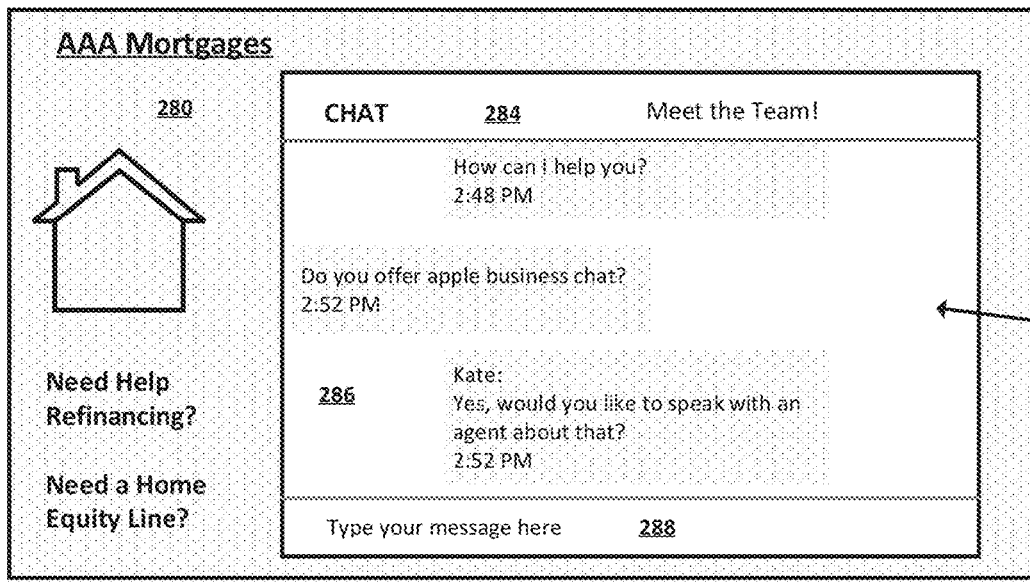
FIG. 5 is an exemplary customer chat interface according to embodiments of the present invention.

In an embodiment, chat systems may be used for journey personalization. A customer may utilize a bot to personalize their journey through being presented with details of how their journey will be orchestrated. Input received from the customer is in turn used to update aspects of the customer journey. Turning to FIGS. 3, 4 and 5, various aspects of chat systems and chatbots are shown. As will be seen, present embodiments may include or be enabled by such chat features, which, in general, enable the exchange of text messages between different parties. Those parties may include live persons, such as customers and agents, as well as automated processes, such as bots or chatbots.

By way of background, a bot (also known as an "Internet bot") is a software application that runs automated tasks or scripts over the Internet. Typically, bots perform tasks that are both simple and structurally repetitive at a much higher rate than would be possible for a person. A chatbot is a particular type of bot and, as used herein, is defined as a piece of software and/or hardware that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, while simpler ones scan for keywords within the input and then select a reply from a database based on matching keywords or wording pattern.

Before proceeding further with the description of the present invention, an explanatory note will be provided in regard to referencing system components—e.g., modules, servers, and other components—that have already been introduced in any previous figure. Whether or not the subsequent reference includes the corresponding numerical identifiers used in the previous figures, it should be understood that the reference incorporates the example described in the previous figures and, unless otherwise specifically limited, may be implemented in accordance with either that examples or other conventional technology capable of fulfilling the desired functionality, as would be understood by one of ordinary skill in the art. Thus, for example, subsequent mention of a "contact center system" should be understood as referring to the exemplary "contact center system 200" of FIG. 2 and/or other conventional technologies for implementing a contact center system. As additional examples, a subsequent mention below to a "customer device", "agent device", "chat server", or "computing device" should be understood as referring to the exemplary "customer device 205", "agent device 230", "chat server 240", or "computing device 200", respectively, of FIGS. 1-2, as well as conventional technology for fulfilling the same functionality.

Chat features and chatbots will now be discussed in greater specificity with reference to the exemplary embodiments of a chat server, chatbot, and chat interface depicted, respectively, in FIGS. 3, 4, and 5. While these examples are provided with respect to chat systems implemented on the contact center-side, such chat systems may be used on the customer-side of an interaction. Thus, it should be understood that the exemplary chat systems of FIGS. 3, 4, and 5 may be modified for analogous customer-side implementation, including the use of customer-side chatbots configured to interact with agents and chatbots of contact centers on a customer's behalf. It should further be understood that chat features may be utilized by voice communications via converting text-to-speech and/or speech-to-text.

Referring specifically now to FIG. 3, a more detailed block diagram is provided of a chat server 240, which may be used to implement chat systems and features. The chat server 240 may be coupled to (i.e., in electronic communication with) a customer device 205 operated by the customer over a data communications network 210. The chat server 240, for example, may be operated by a enterprise as part of a contact center for implementing and orchestrating chat conversations with the customers, including both automated chats and chats with human agents. In regard to automated chats, the chat server 240 may host chat automation modules or chatbots 260A-260C (collectively referenced as 260), which are configured with computer program instructions for engaging in chat conversations. Thus, generally, the chat server 240 implements chat functionality, including the exchange of text-based or chat communications between a customer device 205 and an agent device 230 or a chatbot 260. As discussed more below, the chat server 240 may include a customer interface module 265 and agent interface module 266 for generating particular UIs at the customer device 205 and the agent device 230, respectively, that facilitate chat functionality.

In regard to the chatbots 260, each can operate as an executable program that is launched according to demand. For example, the chat server 240 may operate as an execution engine for the chatbots 260, analogous to loading VoiceXML files to a media server for interactive voice response (IVR) functionality. Loading and unloading may be controlled by the chat server 240, analogous to how a VoiceXML script may be controlled in the context of an interactive voice response. The chat server 240 may further provide a means for capturing and collecting customer data in a unified way, similar to customer data capturing in the context of IVR. Such data can be stored, shared, and utilized in a subsequent conversation, whether with the same chatbot, a different chatbot, an agent chat, or even a different media type. In example embodiments, the chat server 240 is configured to orchestrate the sharing of data among the various chatbots 260 as interactions are transferred or transitioned over from one chatbot to another or from one chatbot to a human agent. The data captured during interaction with a particular chatbot may be transferred along with a request to invoke a second chatbot or human agent.

In exemplary embodiments, the number of chatbots 260 may vary according to the design and function of the chat server 240 and is not limited to the number illustrated in FIG. 3. Further, different chatbots may be created to have different profiles, which can then be selected between to match the subject matter of a particular chat or a particular customer. For example, the profile of a particular chatbot may include expertise for helping a customer on a particular subject or communication style aimed at a certain customer preference. More specifically, one chatbot may be designed to engage in a first topic of communication (e.g., opening a new account with the business), while another chatbot may be designed to engage in a second topic of communication (e.g., technical support for a product or service provided by the business). Or, chatbots may be configured to utilize different dialects or slang or have different personality traits or characteristics. Engaging chatbots with profiles that are catered to specific types of customers may enable more effective communication and results. The chatbot profiles may be selected based on information known about the other party, such as demographic information, interaction history, or data available on social media. The chat server 240 may host a default chatbot that is invoked if there is insufficient information about the customer to invoke a more specialized chatbot. Optionally, the different chatbots may be customer selectable. In exemplary embodiments, profiles of chatbots 260 may be stored in a profile database hosted in the storage device 220. Such profiles may include the chatbot's personality, demographics, areas of expertise, and the like.

The customer interface module 265 and agent interface module 266 may be configured to generating user interfaces (UIs) for display on the customer device 205 that facilitate chat communications between the customer and a chatbot 260 or human agent. Likewise, an agent interface module 266 may generate particular UIs on the agent device 230 that facilitate chat communications between an agent operating an agent device 230 and the customer. The agent interface module 266 may also generate UIs on an agent device 230 that allow an agent to monitor aspects of an ongoing chat between a chatbot 260 and a customer. For example, the customer interface module 265 may transmit signals to the customer device 205 during a chat session that are configured to generated particular UIs on the customer device 205, which may include the display of the text messages being sent from the chatbot 260 or human agent as well as other non-text graphics that are intended to accompany the text messages, such as emoticons or animations. Similarly, the agent interface module 266 may transmit signals to the agent device 230 during a chat session that are configured to generated UIs on the agent device 230. Such UIs may include an interface that facilitates the agent selection of non-text graphics for accompanying outgoing text messages to customers.

In exemplary embodiments, the chat server 240 may be implemented in a layered architecture, with a media layer, a media control layer, and the chatbots executed by way of the IMR server 216 (similar to executing a VoiceXML on an IVR media server). As described above, the chat server 240 may be configured to interact with the knowledge management server 234 to query the server for knowledge information. The query, for example, may be based on a question received from the customer during a chat. Responses received from the knowledge management server 234 may then be provided to the customer as part of a chat response.

Referring specifically now to FIG. 4, a block diagram is provided of an exemplary chat automation module or chatbot 260. As illustrated, the chatbot 260 may include several modules, including a text analytics module 270, dialog manager 272, and output generator 274. It will be appreciated that, in a more detailed discussion of chatbot operability, other subsystems or modules may be described, including, for examples, modules related to intent recognition, text-to-speech or speech-to-text modules, as well as modules related to script storage, retrieval, and data field processing in accordance with information stored in agent or customer profiles. Such topics, however, are covered more completely in other areas of this disclosure—for example, in relation to FIGS. 6 and 7—and so will not be repeated here. It should nevertheless be understood that the disclosures made in these areas may be used in analogous ways toward chatbot operability in accordance with functionality described herein.

The text analytics module 270 may be configured to analyze and understand natural language. In this regard, the text analytics module may be configured with a lexicon of the language, syntactic/semantic parser, and grammar rules for breaking a phrase provided by the customer device 205 into an internal syntactic and semantic representation. The configuration of the text analytics module depends on the particular profile associated with the chatbot. For example, certain words may be included in the lexicon for one chatbot but excluded that of another.

The dialog manager 272 receives the syntactic and semantic representation from the text analytics module 270 and manages the general flow of the conversation based on a set of decision rules. In this regard, the dialog manager 272 maintains a history and state of the conversation and, based on those, generates an outbound communication. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script and outputs the response to the output generator 274. In exemplary embodiments, the dialog manager 272 may also be configured to compute a confidence level for the selected response and provide the confidence level to the agent device 230. Every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, transfer to a human agent to assist, and the like. The confidence level may be utilized to assist the system with deciding whether the detection, analysis, and response to the customer input is appropriate or whether a human agent should be involved. For example, a threshold confidence level may be assigned to invoke human agent intervention based on one or more business rules. In exemplary embodiments, confidence level may be determined based on customer feedback. As described, the response selected by the dialog manager 272 may include information provided by the knowledge management server 234.

In exemplary embodiments, the output generator 274 takes the semantic representation of the response provided by the dialog manager 272, maps the response to a chatbot profile or personality (e.g., by adjusting the language of the response according to the dialect, vocabulary, or personality of the chatbot), and outputs an output text to be displayed at the customer device 205. The output text may be intentionally presented such that the customer interacting with a chatbot is unaware that it is interacting with an automated process as opposed to a human agent.

Reference will now be made to FIG. 5, in which a webpage 280 having an exemplary implementation of a chat feature 282 is presented. The webpage 280, for example, may be associated with a enterprise website and intended to initiate interaction between prospective or current customers visiting the webpage and a contact center associated with the enterprise. As will be appreciated, the chat feature 282 may be generated on any type of customer device 205, including personal computing devices such as laptops, tablet devices, or smart phones. Further, the chat feature 282 may be generated as a window within a webpage or implemented as a full-screen interface. As in the example shown, the chat feature 282 may be contained within a defined portion of the webpage 280 and, for example, may be implemented as a widget via the systems and components described above and/or any other conventional means. In general, the chat feature 282 may include an exemplary way for customers to enter text messages for delivery to a contact center.

As an example, the webpage 280 may be accessed by a customer via a customer device, such as the customer device, which provides a communication channel for chatting with chatbots or live agents. In exemplary embodiments, as shown, the chat feature 282 includes generating a user interface, which is referred to herein as a customer chat interface 284, on a display of the customer device. The customer chat interface 284, for example, may be generated by the customer interface module of a chat server, such as the chat server, as already described. As described, the customer interface module 265 may send signals to the customer device 205 that are configured to generate the desired customer chat interface 284, for example, in accordance with the content of a chat message issued by a chat source, which, in the example, is a chatbot or agent named "Kate". The customer chat interface 284 may be contained within a designated area or window, with that window covering a designated portion of the webpage 280. The customer chat interface 284 also may include a text display area 286, which is the area dedicated to the chronological display of received and sent text messages. The customer chat interface 284 further includes a text input area 288, which is the designated area in which the customer inputs the text of their next message. As will be appreciated, other configurations are also possible.

Embodiments of the present invention include systems and methods for automating and augmenting customer actions during various stages of interaction with a customer service provider or contact center. As will be seen, those various stages of interaction may be classified as pre-contact, during-contact, and post-contact stages (or, respectively, pre-interaction, during-interaction, and post-interaction stages). With specific reference now to FIG. 6, an exemplary customer automation system 300 is shown that may be used with embodiments of the present invention. To better explain how the customer automation system 300 functions, reference will also be made to FIG. 7, which provides a flowchart 350 of an exemplary method for automating customer actions when, for example, the customer interacts with a contact center. Additional information related to customer automation are provided in U.S. application Ser. No. 16/151,362, filed on Oct. 4, 2018, entitled "System and Method for Customer Experience Automation", the content of which is incorporated herein by reference.

Figure 6:
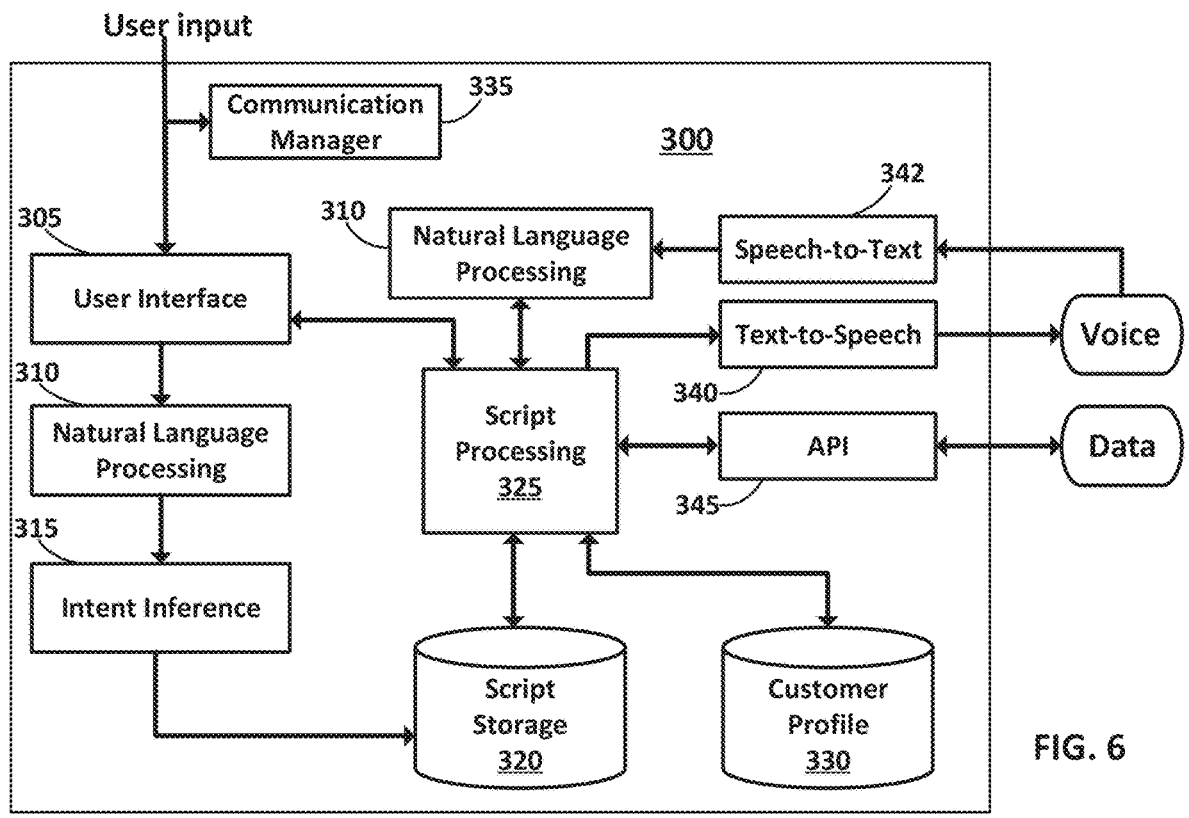
FIG. 6 is a block diagram of a customer automation system according to embodiments of the present invention.

The customer automation system 300 of FIG. 6 represents a system that may be generally used for customer-side automations, which, as used herein, refers to the automation of actions taken on behalf of a customer in interactions with customer service providers or contact centers. Such interactions may also be referred to as "customer-contact center interactions" or simply "customer interactions". Further, in discussing such customer-contact center interactions, it should be appreciated that reference to a "contact center" or "customer service provider" is intended to generally refer to any customer service department or other service provider associated with an organization or enterprise (such as, for example, a business, governmental agency, non-profit, school, etc.) with which a user or customer has business, transactions, affairs or other interests.

In exemplary embodiments, the customer automation system 300 may be implemented as a software program or application running on a mobile device or other computing device, cloud computing devices (e.g., computer servers connected to the customer device 205 over a network), or combinations thereof (e.g., some modules of the system are implemented in the local application while other modules are implemented in the cloud. For the sake of convenience, embodiments are primarily described in the context of implementation via an application running on the customer device 205. However, it should be understood that present embodiments are not limited thereto.

The customer automation system 300 may include several components or modules. In the illustrated example of FIG. 6, the customer automation system 300 includes a user interface 305, natural language processing (NLP) module 310, intent inference module 315, script storage module 320, script processing module 325, customer profile database or module (or simply "customer profile") 330, communication manager module 335, text-to-speech module 340, speech-to-text module 342, and application programming interface (API) 345, each of which will be described with more particularity with reference also to flowchart 350 of FIG. 7. It will be appreciated that some of the components of and functionalities associated with the customer automations system 300 may overlap with the chatbot systems described above in relation to FIGS. 3, 4, and 5. In cases where the customer automation system 300 and such chatbot systems are employed together as part of a customer-side implementation, such overlap may include the sharing of resources between the two systems.

Figure 7:
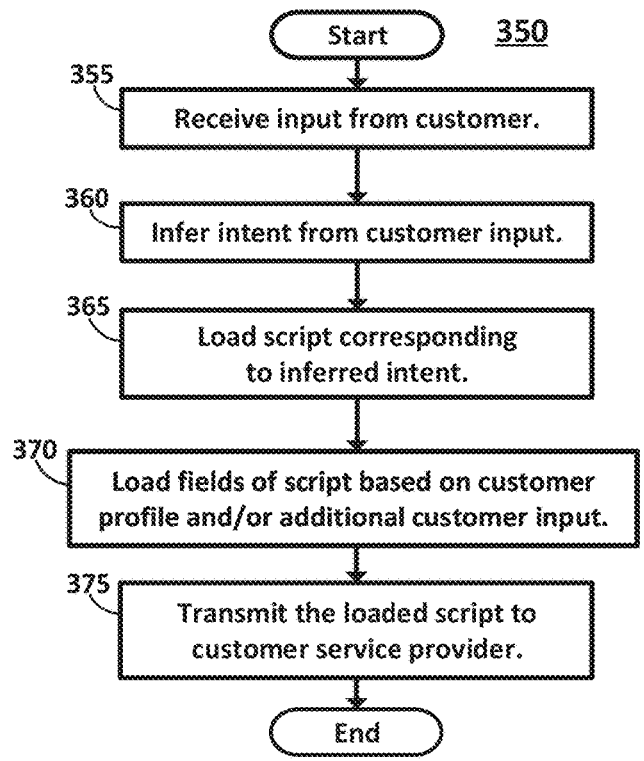
FIG. 7 is a flowchart of a method for automating an interaction on behalf of a customer according to embodiments of the present invention.

In an example of operation, with specific reference now to the flowchart 350 of FIG. 7, the customer automation system 300 may receive input at an initial step or operation 355. Such input may come from several sources. For example, a primary source of input may be the customer, where such input is received via the customer device. The input also may include data received from other parties, particularly parties interacting with the customer through the customer device. For example, information or communications sent to the customer from the contact center may provide aspects of the input. In either case, the input may be provided in the form of free speech or text (e.g., unstructured, natural language input). Input also may include other forms of data received or stored on the customer device.

Continuing with the flow diagram 350, at an operation 360, the customer automation system 300 parses the natural language of the input using the NLP module 310 and, therefrom, infers a intent using the intent inference module 315. For example, where the input is provided as speech from the customer, the speech may be transcribed into text by a speech-to-text system (such as a large vocabulary continuous speech recognition or LVCSR system) as part of the parsing by the NLP module 310. The transcription may be performed locally on the customer device 205 or the speech may be transmitted over a network for conversion to text by a cloud-based server. In certain embodiments, for example, the intent inference module 315 may automatically infer the customer's intent from the text of the provided input using artificial intelligence or machine learning techniques. Such artificial intelligence techniques may include, for example, identifying one or more keywords from the customer input and searching a database of potential intents corresponding to the given keywords. The database of potential intents and the keywords corresponding to the intents may be automatically mined from a collection of historical interaction recordings. In cases where the customer automation system 300 fails to understand the intent from the input, a selection of several intents may be provided to the customer in the user interface 305. The customer may then clarify their intent by selecting one of the alternatives or may request that other alternatives be provided.

After the customer's intent is determined, the flowchart 350 proceeds to an operation 365 where the customer automation system 300 loads a script associated with the given intent. Such scripts, for example, may be stored and retrieved from the script storage module 320. Such scripts may include a set of commands or operations, pre-written speech or text, and/or fields of parameters or data (also "data fields"), which represent data that is required to automate an action for the customer. For example, the script may include commands, text, and data fields that will be needed in order to resolve the issue specified by the customer's intent. Scripts may be specific to a particular contact center and tailored to resolve particular issues. Scripts may be organized in a number of ways, for example, in a hierarchical fashion, such as where all scripts pertaining to a particular organization are derived from a common "parent" script that defines common features. The scripts may be produced via mining data, actions, and dialogue from previous customer interactions. Specifically, the sequences of statements made during a request for resolution of a particular issue may be automatically mined from a collection of historical interactions between customers and customer service providers. Systems and methods may be employed for automatically mining effective sequences of statements and comments, as described from the contact center agent side, are described in U.S. patent application Ser. No. 14/153,049 "Computing Suggested Actions in Caller Agent Phone Calls By Using Real-Time Speech Analytics and Real-Time Desktop Analytics," filed in the United States Patent and Trademark Office on Jan. 12, 2014, the entire disclosure of which is incorporated by reference herein.

With the script retrieved, the flowchart 350 proceeds to an operation 370 where the customer automation system 300 processes or "loads" the script. This action may be performed by the script processing module 325, which performs it by filling in the data fields of the script with appropriate data pertaining to the customer. More specifically, the script processing module 325 may extract customer data that is relevant to the anticipated interaction, with that relevance being predetermined by the script selected as corresponding to the customer's intent. The data for many of the data fields within the script may be automatically loaded with data retrieved from data stored within the customer profile 330. As will be appreciated, the customer profile 330 may store particular data related to the customer, for example, the customer's name, birth date, address, account numbers, authentication information, and other types of information relevant to customer service interactions. The data selected for storage within the customer profile 330 may be based on data the customer has used in previous interactions and/or include data values obtained directly by the customer. In case of any ambiguity regarding the data fields or missing information within a script, the script processing module 325 may include functionality that prompts and allows the customer to manually input the needed information.

Referring again to the flowchart 350, at an operation 375, the loaded script may be transmitted to the customer service provider or contact center. As discussed more below, the loaded script may include commands and customer data necessary to automate at least a part of an interaction with the contact center on the customer's behalf. In exemplary embodiments, an API 345 is used so to interact with the contact center directly. Contact centers may define a protocol for making commonplace requests to their systems, which the API 345 is configured to do. Such APIs may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, the customer automation system 300 may automatically generate a formatted message in accordance with a defined protocol for communication with a contact center, where the message contains the information specified by the script in appropriate portions of the formatted message.

Figure 8:
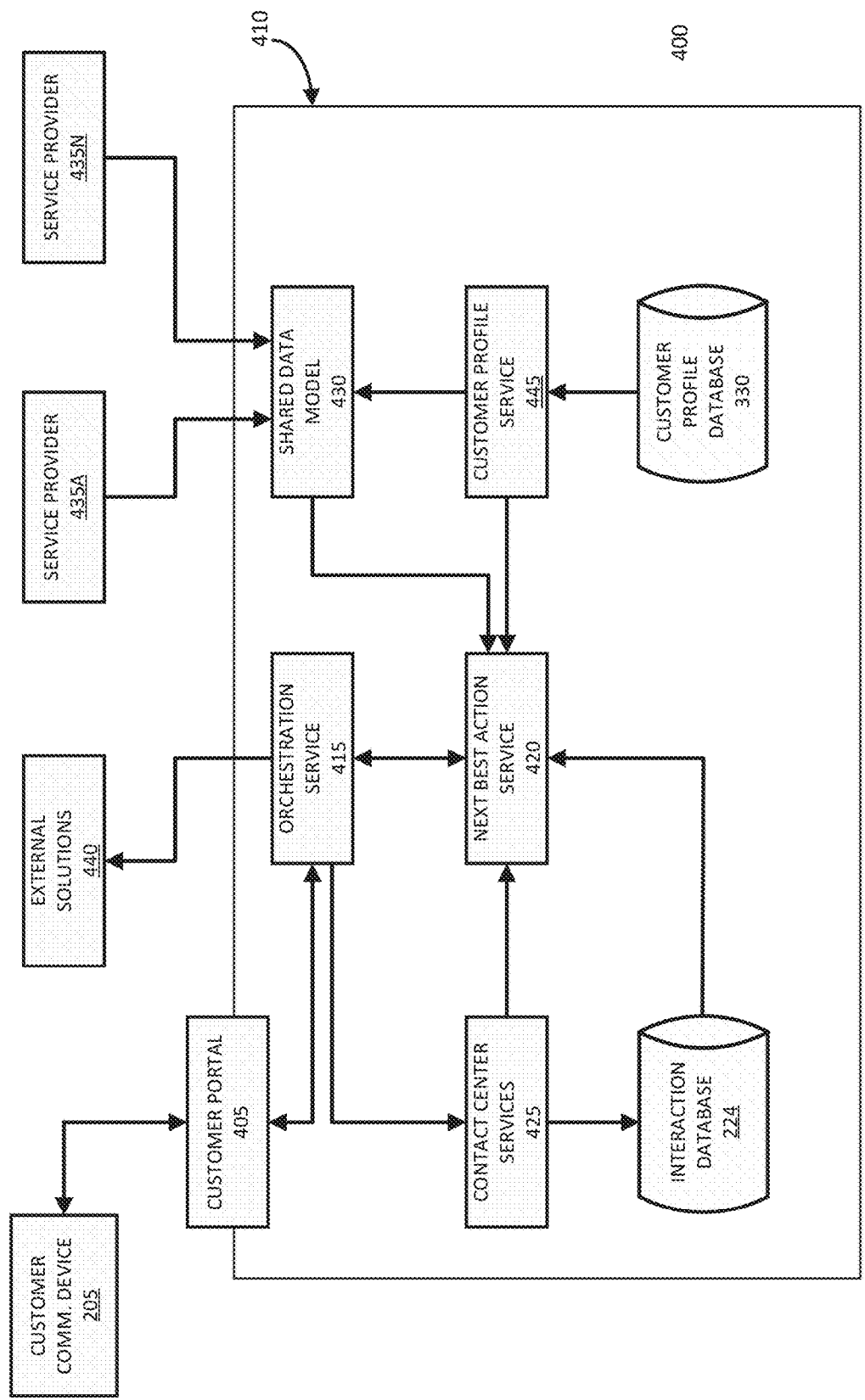
FIG. 8 is schematic block diagram showing further details of a journey orchestration system operating as part of the contact center system according to embodiments of the present invention.

A brief background discussion will now be provided that relates to customer service technologies and certain industry shortcomings that are address by the present invention. With reference to FIG. 8, the discussion will then turn with specificity to the functionality associated with several exemplary embodiments and improvements these offer.

With the recent advent of new technological capabilities, significant advancements have been made in the area of customer service. For example, the introduction of predictive skills based routing and interactive voice response systems enhanced how service is delivered to customers while also greatly improving operating efficiencies in contact centers. With advancements in conversational artificial intelligence, the delivery of services via self or assisted service has become more sophisticated and autonomous. Further, the leveraging of direct and abstract integrations to intelligent systems (e.g., customer relationship management systems) has been utilized, at least in a limited way, to allow more personalized engagement with customers. However, the orchestration of such customer engagement, which will also be referred to as a "customer journey", is still almost exclusively managed and controlled by contact centers or service providers. As used herein, a "customer journey" is the process by which a customer interacts with a company or service provider in order to achieve a goal. The extent to which a customer is able to provide input as to how their own customer journey unfolds with particular service providers is substantially limited to the customer indicating a preference with regard to a few, narrowly defined options. For example, this may include selecting a preferred communication channel for reaching the customer. As such, the marketplace is generally devoid of solutions in this area that empower customer to actively influence how their engagements, interactions, and relationships with service providers are managed, i.e., how their customer journey is orchestrated.

As will be seen, systems and methods of the present invention address many of these deficiencies by enhancing customer control in several way. For example, customers are empowered to actively manage how their customer journey—including interactions, engagements, data transfers, and other actions necessary to achieve their goal—unfolds with service providers. That is, systems and methods of the present invention allow customers to personally orchestrate their own customer journeys. In accordance with certain aspects of the present invention, customers may selectively and dynamically share their own data between service providers in ways that enable those service providers to deliver more personalized services. In one embodiment, for example, a graphical user interface associated with a customer interface portal allows customers to view their customer journey holistically. Customers can visually examine the path of their journey and make edits within this user interface. As will be appreciated, providing such capabilities empowers the customer to take control of engagements with service providers and, when effectively combined with other customer service technological advancements, may enable the delivery of true personalization as a service.

Turning now to FIG. 8, in accordance with embodiments of the present invention, a schematic block diagram is provided that shows a customer journey orchestration system 400 that operates as part of the contact center system for delivering a customer journey orchestration service. As will be seen, the system 400 of FIG. 8 can be used for the central orchestration and management of interactions and engagements by a customer with affiliated service providers, i.e., organizations, businesses, contact centers, and other entities. For example, in accordance with exemplary embodiments, a customer may use a communication device 205 to access a customer interface portal 405. The customer interface portal 405 may include user interfaces that facilitate the customer orchestration of their own customer journey and influence aspects of that journey through communication with a virtual datacenter 410, As shown in FIG. 8, the virtual datacenter may include several subsystems or components, including an orchestration service 415, a next best action service 420, contact center services 425, an interaction database 224, a shared data model 430, a customer profile service 445, and a customer profile database 330.

In accordance with exemplary embodiments, the customer journey orchestration service is provided by an independent facilitator entity. The facilitator entity may be a distinct entity that is legally separate from each of the affiliated service providers.

In accordance with exemplary embodiments, the customer interface portal 405 may be associated with a virtual datacenter 410, which, for example, may have a cloud-based infrastructure. The customer interface portal 405 can be securely accessed by the customer via an application that is downloaded to the communication device 205. The communication device 205, for example, may be a telephone, smart phone, computer, tablet, laptop or the like. In accordance with functionality described herein, customers may generally use the communication devices 205 to initiate, manage, and conduct communications with the contact center system 200, including telephone calls, emails, chats, text messages, web-browsing sessions, and other multimedia transactions. As discussed more below, the customers may configure accounts with the customer journey orchestration service via a configuration process provided by the facilitator entity.

In accordance with exemplary embodiments, a customer can input their information through the customer interface portal 405. Such information may be maintained as a customer profile that is stored in the customer profile database 330 which is accessed by the customer profile service 445. In accordance with exemplary embodiments, the customer is given full access to the data stored within their customer profile. Such data may include personally identifiable information (PII) data as well as customer journey data. For example, customer journey data may include behavior data recorded on a website that lead up to an outcome, such as purchasing or seeking customer support. Customer journey data may further include interaction data. In accordance with exemplary embodiments, such profile data may be maintained across each of the brands or service providers related to a particular customer. In accordance with exemplary embodiments, via the customer interface portal 405, customers are allowed to see each of the organizations or service providers that have registered to use this service. Customers may register personal accounts directly with the service providers. The customer may have the ability to unsubscribe or close at any time.

In accordance with exemplary embodiments, the customer, via the customer interface portal 405, would be able to grant data sharing permissions (or simply "permissions") to individual service providers that then allows those providers to view, update certain aspects of the information stored in the customer's customer profile. Via the customer interface portal, customers are able to interact with brands and service providers without having to necessarily disclose all their private contact details and preferences. In certain embodiments, elements of the customer profile can be delegated to organizations/service providers. From a data privacy perspective, the organization updating a customer profile would not be visible to other organizations who might have also been granted access to the profile. Thus, in accordance with exemplary embodiments, the customer is able to share information between the different service providers 435A-N using the customer interface portal 405.

In accordance with exemplary embodiments, the customer is able to view external solutions 440 and other data, which may be made accessible via public APIs. The customer interface portal 405 communicates with an orchestration service 415, which coordinates such resources. The orchestration service 415 communicates with the external solutions 440, the contact center services 425 (see FIG. 2), and the next best action service 420. The external solutions 440 provide APIs for assisting with orchestration. For example, these might include live traffic data, weather information, stock quotes, real-time information from airlines and airports, real-time tracking of parcels, etc.

In accordance with exemplary embodiments, the next best action service 420 utilizes a set of interaction management processes that takes a set of inputs that include raw user online data (website data, behavior data, demographics data), hard constraints configuration (agent and queue assignment), and analytics data in various forms (e.g. smart attributes derived based on the analysis of raw data using machine learning, such as need or likelihood to achieve a specific outcome, which can change dynamically during a customer journey, purchase a product, book a demo, require support, likelihood of accepting an interaction offer, etc.) in order to make interaction management decisions. In accordance with exemplary embodiments, such interaction management decisions can include: identification of customer most valuable within a persona set given an outcome to maximize, smart call routing based on agent efficiency clusters, interaction recommendations to agents (best channel for conducting an interaction, e.g., chat, audio, video, and best time to conduct the interaction), as well as automatic interaction offers focused on shaping a customer journey and optimizing business outcomes. Additional information related to next best action services is provided in U.S. application Ser. No. 16/352,022, filed on Mar. 13, 2019, entitled "System and Method for Interaction Routing by Applying Predictive Analytics and Machine Learning to Web and Mobile Application Context", the content of which is incorporated herein by reference. The raw user data can be provided from the customer profile service 445, the shared data model 430, the contact center (FIG. 2), and the interaction database 224.

In accordance with exemplary embodiments, the contact center services 425 (as described in more detail in relation to FIG. 2) provide inbound/outbound communication, artificial intelligence (e.g. predictive engagement capabilities, bots, predictive routing), and other capabilities that may be required as part of the customer journey. The communications may be automated or agent assisted.

In accordance with exemplary embodiments, the interaction database 224 stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). The interaction database 224 provides information to the next best action service 420, which makes recommendations based on a multitude of inputs as to what the customer could or should edit in their journey to better personalize it.

In accordance with exemplary embodiments, the next best action service 420 receives information from the customer profile service 445 and the shared data model 430. The customer profile service 445 calls on and provides to the next best action service 420 and the shared data model 430 particular data related to the customer, for example, the customer's name, birth date, address, account numbers, authentication information, and other types of information relevant to customer service interactions which may be stored in the customer profile database 330. The data selected for storage within the customer profile database 330 may be based on data the customer has used in previous interactions and/or include data values obtained directly by the customer.

The shared data model 430 comprises a unified reference for data. Some data may be shared, while other data may be specific to a single application or organization. Access by the service providers 435A-N is controlled by a user's authorizations. It should be noted that while only two service providers 435A and 435N are illustrated in FIG. 8, it is within the scope of the embodiments described herein for there to be one or more service providers connected with the system 400. Thus, in accordance with exemplary embodiments, the customer select to share information between a plurality of service providers (via a customer interaction model, for example), thus allowing events and notifications from one service provider to be consumed by another service provider with the purpose of enhancing the overall customer journey for the customer.

Turning to an exemplary case, consider a couple that is preparing a mortgage application to buy a home. As will be appreciated, the customer journey associated with achieving the goal of acquiring a mortgage and buying a home may long and complex one, encompassing may long running, asynchronous conversations with several service providers that spans several months. During this process, frequent interaction may be required between the bank and the applicants. By sharing some basic information, like calendar information and preferred communication channels (e.g., chat, email, or voice), the customer journey orchestration service within the bank can more seamlessly schedule appointments, follow-ups and request for information in ways that align with the couple's preferences. The applicants could choose to share their mortgage application status with other service providers (e.g., a real estate agency or insurance provider). By allowing the bank to update this status in their private profile, the applicants enable other service providers to orchestrate their services based on the status of a dependent or complimentary event. For example, a real-estate agency may be proactively notified of the progress of the mortgage application. The real-estate agency could then initiate next steps with the customer through, for example, scheduling viewings for interested properties, inviting the customer to upcoming auctions, or preparing final paperwork for the property the couple decide to purchase. Additionally, the insurance provider, for example, could receive a proactive notification on the status of the mortgage application, which could allow the insurance provider to proceed with processing the insurance policies required as part of their mortgage process. To continue the example, the couple may decide that the sharing of salary and health information between the bank and the insurance provider is acceptable but decline to share this information other service providers, such as their real-estate vendor. Conversely, information data relating to the customer's wish-list for a home may only be available to the real-estate agent and not shared with the financial and insurance companies. However, calendar information may be shared across all providers. As another example, customers making a mortgage request with their bank could subscribe to notifications via a preferred channel and, once their mortgage status changes, be promptly notified and offered multiple ways to contact the bank to provide further inputs as may be required.

In another example, a frequent business traveler may desire more proactive and personalized service. Such a business traveler may allow their travel plans to be viewed and updated by selected service providers (e.g., airlines, hotels, ride services). In the event of change or delay in travel plans, either based on a service provider updating a status in the business traveler's profile or based on the traveler updating a status directly, other service providers can dynamically initiate a workflow in their customer journey orchestration. In accordance with exemplary embodiments, such a business traveler can view and edit parts of their journey, thus providing the customer with the ability to further personalize elements of the orchestration to optimize and improve the personalization of the experience whether the journey is new or in progress. For example, the business traveler can update their airline ticket to take an earlier flight. As part of their overall journey, the traveler, by making a selection in the customer interface portal, may allow the ground transport company (Uber or ride service) to receive notification of this flight change so that they can proactively change the traveler's booking. However, the traveler realizes that altering their hotel booking is not needed so elects not to allow the hotel to be notified of the change in flight. In another example, the traveler, having configured an alert in the journey for any transport issues in New York City, is notified from a live traffic management service of roadwork around JFK airport that evening. The customer is notified and books an earlier flight, again electing to notify their ground transport provider so that their collection time can be automatically updated. In addition to delivering an AI based journey orchestration application (for use by service providers), present systems and methods allow the business traveler to view and edit parts of that journey, thereby providing end users with the ability to further personalize elements of the orchestration to optimize and improve the personalization of the experience. This type of functionality would present a unique selling point in the industry, i.e., the ability to personalize a new or in progress customer journey based on configuration selections received directly from the customer.

In another example, a customer may be browsing the web page of an insurance provider looking for a home insurance quote. In addition to providing the required details to receive an online quote, the insurance company could also allow the customer to view how their journey would flow and offer the customer the ability to personalize this journey (e.g. what notifications they want to receive, how they want a follow-up to occur, frequency of communications and how these communications are received, etc.). Should the customer purchase the insurance policy, the journey would move from acquisition phase to the retention phase. The customer may be provided with the controls on how they would like to structure the renewal process, as opposed to be following the insurance company's default path. In yet another embodiment, a customer of a telephony/ISP provider might view the journey for support queries. Based on the tier of their subscription package, the customer may be able to edit the journey to bypass self-service or have any new support query always result in a call-back.

Figure 9:
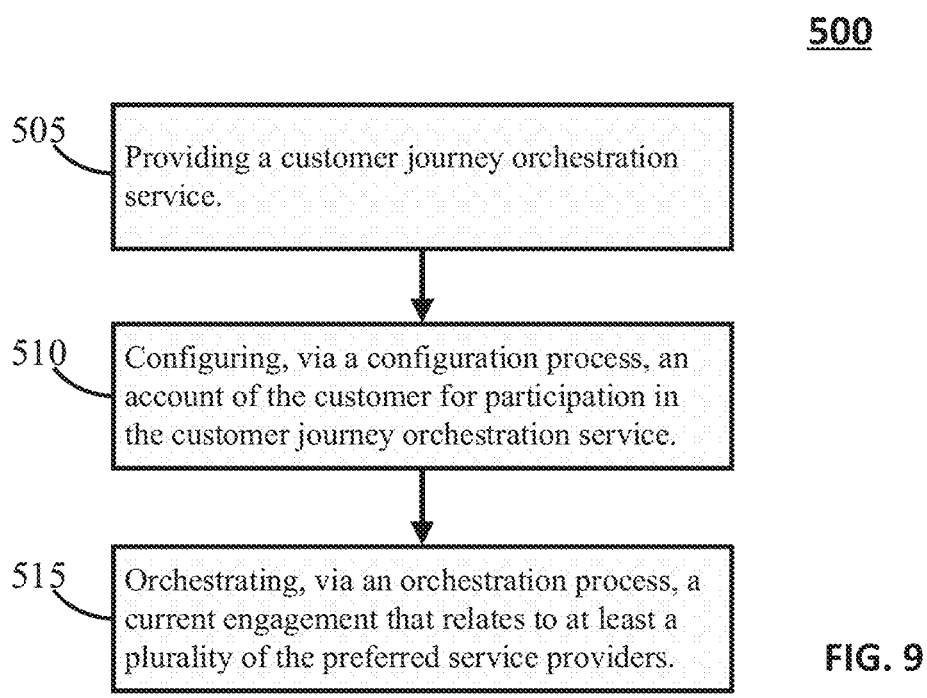
FIG. 9 is flow diagram showing a journey orchestration method according to embodiments of the present invention.

With reference now to FIG. 9, a flowchart 500 is shown illustrating an exemplary method according to the present invention. The method 500 generally relates to customers orchestrating engagements with service providers pursuant to the ideas and concepts already provided. The method may include an initial step 505 of providing, by an independent facilitator entity, a customer journey orchestration service. The customer journey orchestration service may include: a group of the service providers affiliated with the customer journey orchestration service; a virtual datacenter in which cloud-based applications and databases are operably linked to communication devices of the customers and to the group of affiliated services providers; customer interface portals for enabling the customers to access and interact with the virtual datacenter, each of the customer interface portals being associated with a specific one of the customers and accessed thereby by a corresponding one of the communication devices; and a customer profile database that stores customer profiles corresponding to respective ones of the customers.

As part of a next step 510, the method 500 may include configuring, by the facilitator entity via a configuration process, an account of the customer for participation in the customer journey orchestration service. The configuration process, when described in relation to a first customer and a first communication device that corresponds to the first customer, may include providing a first customer interface portal accessible by the first customer via the first communication device. The configuration process may further include creating a first customer profile in the customer profile database for storing customer data related to the first customer. The configuration process may further include receiving, from the first communication device via the first customer interface portal, customer data relating to the first customer. The customer data may include: personally identifiable information relating to the first customer; selections made by the first customer of particular service providers from the group of the affiliated service providers as preferred service providers for affiliation with the first customer; customer journey data that includes interaction data taken from interactions occurring between the first customer and the preferred service providers in relation to past engagements with the preferred service providers; and data sharing permissions provided by the first customer granting access rights to selected ones of the preferred providers that allows access to selected portions of the customer data in the first customer profile. The configuration process may further include creating a shared data model based on the received data sharing permissions that delineates an accessible portion of the customer data in the first customer profile that each of the preferred service providers is allowed to access and a restricted portion of the customer data in the first customer profile that each of the preferred service providers is prevented to access.

As part of a next step 515, the method 500 may include orchestrating, by the facilitator entity via an orchestration process, a current and ongoing one of the engagements (hereinafter "current engagement") that relates to at least a plurality of the preferred service providers. The orchestration process, when described in relation to the first customer, may include: receiving data related to a first notification (hereinafter "first notification data") from a first preferred service provider, wherein the first notification data relates to the current engagement; updating the customer journey data stored in the first customer profile to include the first notification data; and in response to confirming that it is permitted by the shared data model, allowing a second preferred service provider access to the first notification data stored in the first customer profile.

In exemplary embodiments, the configuration process further may include configuring the first customer interface portal so that an entirety of the customer data stored in the first customer profile database is accessible to the first customer so that the first customer is able to review the customer data and make modifications thereto.

In exemplary embodiments, the configuration process further may include: receiving a modification from the first customer that modifies a first data sharing permission of the data sharing permissions; and modifying the shared data model so that the shared data model reflects the modification to the first data sharing permission. In exemplary embodiments, the orchestration process further may include: in response to receiving the first notification data, sending a prompt to the first customer inquiring whether the first customer wants to modify the first data sharing permission based on a subject matter of the first notification data. In such cases, the modification received from the first customer may be received via a response mechanism activated by the first customer via the prompt.

In exemplary embodiments, the access to the first notification data communicates information to the second preferred service provider that enables the second preferred service provider to modify a manner in which a service related to the current engagement is delivered to the first customer. In exemplary embodiments, the first notification data relates to an occurrence of a first event related to a service being provided by the first service provider. In such cases, the first event may be a prerequisite to the service being provided by the second preferred service provider.

In exemplary embodiments, the orchestration process further may include: determining a plurality of the preferred service providers that are related to the current engagement; and in response to receiving the first notification data, sending a prompt to the first customer inquiring whether the first customer wants to modify the data sharing permissions related to any of the plurality of the preferred service providers based on a subject matter of the first notification data. In such cases, the configuration process further may include: receiving modifications from the first customer that modifies data sharing permissions; and modifying the shared data model so that the shared data model reflects the received modification to the sharing permissions. In such cases, the modifications to the data sharing permissions may allow the second preferred service provider access to the first notification data stored in the first customer profile, while also disallowing a third preferred service provider access to the first notification data stored in the first customer profile (where the third preferred service provider would have had access to the first notification data but for the received modifications to the data sharing permissions). The modifications to the data sharing permissions received from the first customer may be received via a response mechanism activated by the first customer via the prompt.

In exemplary embodiments, the facilitator entity is a distinct entity that is legally separate from each of the service providers in the group of affiliated service providers.

In exemplary embodiments, the access granted to the second service provider to the first notification data stored in the first customer profile excludes access to an identity of the first service provider.

In exemplary embodiments, the customer interface portal may include natural language processing and natural language generation capabilities for interacting with the first customer via the first communication device. The first communication device may include one of a smart phone, tablet, or laptop computer.

In exemplary embodiments, the customer journey orchestration service further may include a next best action service. In such cases, the method may further include the step of deriving, by the facilitator entity via a recommendation process, a recommended action for modifying the customer data stored in the first customer profile to improve a personalization level related to how one or more of the preferred service providers delivers a service to the first customer. The recommendation process, when described in relation to the first customer, may include: receiving additional customer journey data related to one or more newly occurring interactions of the current engagement; updating the customer journey data stored in the first customer profile to include the received additional customer journey data; and generating the recommended action by applying a machine learning algorithm to the updated customer journey data to identify patterns therein correlating one or more input factors to one or more outcomes. In an exemplary embodiment, the recommended action may include a recommended modification to a specific data sharing permission of the data sharing permissions. In such cases, the orchestration process further may include: sending a prompt to the first customer inquiring whether the first customer wants to modify the specific data sharing permission pursuant to the recommended modification; receiving an approval from the first customer approving the recommended modification to the specific data sharing permission; and in response to receiving the approval, modifying the shared data model so that the shared data model reflects recommended modification to a specific data sharing permission.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

The invention claimed is:

1. A method related to customers orchestrating engagements with service providers, the method comprising the steps of:
   providing, by an independent facilitator entity, a customer journey orchestration service, wherein the customer journey orchestration service comprises:
      service provider devices associated with a group of service providers affiliated with the customer journey orchestration service;
      a virtual datacenter in which cloud-based applications and databases are operably linked to communication devices of the customers and to the group of affiliated services providers;
      customer interface portals for enabling the customers to access and interact with the virtual datacenter, each of the customer interface portals being associated with a specific one of the customers and accessed thereby by a corresponding one of the communication devices; and
      a customer profile database that stores customer profiles corresponding to respective ones of the customers;
   configuring, by the facilitator entity via a configuration process, an account of the customer for participation in the customer journey orchestration service, wherein the configuration process, when described in relation to a first customer of the customers and a first communication device that corresponds to the first customer, comprises:
      providing a first customer interface portal accessible by the first customer via the first communication device;
      creating a first customer profile in the customer profile database for storing customer data related to the first customer;
      configuring the first customer interface portal so that an entirety of the customer data stored in the first customer profile database is accessible to the first customer so that the first customer is able to review the customer data and make modifications thereto;
      receiving, from the first communication device via the first customer interface portal, customer data relating to the first customer, the customer data comprising:
         personally identifiable information relating to the first customer; selections made by the first customer of particular service providers from the group of affiliated service providers as preferred service providers for affiliation with the account of the first customer;
         customer journey data that includes interaction data taken from interactions occurring between the first customer and the preferred service providers in relation to past engagements with the preferred service providers; and
         data sharing permissions provided by the first customer granting access rights to selected ones of the preferred providers that allows access to selected portions of the customer data in the first customer profile;
      creating a shared data model within the virtual datacenter based on the received data sharing permissions that delineates an accessible portion of the customer data in the first customer profile that each of the preferred service providers is allowed to access and a restricted portion of the customer data in the first customer profile that each of the preferred service providers is prevented to access;
   orchestrating, by the facilitator entity via the customer journey orchestration service, a current and ongoing one of the engagements (hereinafter "current engagement") that relates to at least a plurality of the preferred service providers, wherein the orchestrating, when described in relation to the first customer, comprises:
      establishing, via a network, a communication channel between the first communication device of the first customer and a device associated with a first preferred service provider, wherein the communication channel facilitates the current engagement;
      receiving, via the network, data related to a first notification (hereinafter "first notification data") from the device associated with the first preferred service provider, wherein the first notification data relates to the current engagement;
      in response to receiving the first notification data, sending a prompt, via the network, to the first communication device inquiring whether the first customer wants to modify the first data sharing permission based on a subject matter of the first notification data, wherein the modification received from the first customer is received via a response mechanism activated by the first customer via the prompt;
      updating the customer journey data stored in the first customer profile in the customer profile database to include the first notification data; and
      in response to confirming that it is permitted by the shared data model, allowing a second preferred service provider access, via the network, to the first notification data stored in the first customer profile.

2. The method of claim 1, wherein the configuration process further comprises:
receiving a modification from the first customer that modifies a first data sharing permission of the data sharing permissions; and
modifying the shared data model so that the shared data model reflects the modification to the first data sharing permission.

3. The method of claim 1, wherein the access to the first notification data communicates information to the second preferred service provider that enables the second preferred service provider to modify a manner in which a service related to the current engagement is delivered to the first customer.

4. The method of claim 3, wherein the first notification data relates to an occurrence of a first event related to a service being provided by the first service provider;
wherein the first event is a prerequisite to the service being provided by the second preferred service provider.

5. The method of claim 1, wherein the facilitator entity is a distinct entity that is legally separate from each of the service providers in the group of affiliated service providers.

6. The method of claim 1, wherein the access granted to the second service provider to the first notification data stored in the first customer profile excludes access to data revealing an identity of the first service provider.

7. The method of claim 1, wherein the customer interface portal comprises natural language processing and natural language generation capabilities for interacting with the first customer via the first communication device; and
wherein the first communication device comprises one of a smart phone, tablet, or laptop computer.

8. A method related to customers orchestrating engagements with service providers, the method comprising the steps of:
providing, by an independent facilitator entity, a customer journey orchestration service, wherein the customer journey orchestration service comprises:
service provider devices associated with a group of service providers affiliated with the customer journey orchestration service;
a virtual datacenter in which cloud-based applications and databases are operably linked to communication devices of the customers and to the group of affiliated services providers;
customer interface portals for enabling the customers to access and interact with the virtual datacenter, each of the customer interface portals being associated with a specific one of the customers and accessed thereby by a corresponding one of the communication devices; and
a customer profile database that stores customer profiles corresponding to respective ones of the customers;
configuring, by the facilitator entity via a configuration process, an account of the customer for participation in the customer journey orchestration service, wherein the configuration process, when described in relation to a first customer of the customers and a first communication device that corresponds to the first customer, comprises:
providing a first customer interface portal accessible by the first customer via the first communication device;
creating a first customer profile in the customer profile database for storing customer data related to the first customer;
configuring the first customer interface portal so that an entirety of the customer data stored in the first customer profile database is accessible to the first customer so that the first customer is able to review the customer data and make modifications thereto;
receiving, from the first communication device via the first customer interface portal, customer data relating to the first customer, the customer data comprising:
personally identifiable information relating to the first customer; selections made by the first customer of particular service providers from the group of the affiliated service providers as preferred service providers for affiliation with the account of the first customer;
customer journey data that includes interaction data taken from interactions occurring between the first customer and the preferred service providers in relation to past engagements with the preferred service providers; and
data sharing permissions provided by the first customer granting access rights to selected ones of the preferred providers that allows access to selected portions of the customer data in the first customer profile;
creating a shared data model within the virtual datacenter based on the received data sharing permissions that delineates an accessible portion of the customer data in the first customer profile that each of the preferred service providers is allowed to access and a restricted portion of the customer data in the first customer profile that each of the preferred service providers is prevented to access;
orchestrating, by the facilitator entity via the customer journey orchestration service, a current and ongoing one of the engagements (hereinafter "current engagement") that relates to at least a plurality of the preferred service providers, wherein the orchestrating, when described in relation to the first customer, comprises:
establishing, via a network, a communication channel between the first communication device of the first customer and a device associated with a first preferred service provider, wherein the communication channel facilitates the current engagement;
receiving, via the network, data related to a first notification (hereinafter "first notification data") from the device associated with the first preferred service provider, wherein the first notification data relates to the current engagement;
updating the customer journey data stored in the first customer profile in the customer profile database to include the first notification data;
determining a plurality of the preferred service providers that are related to the current engagement;
in response to receiving the first notification data, sending a prompt, via the network, to the first communication device inquiring whether the first customer wants to modify the data sharing permissions related to any of the plurality of the preferred service providers based on a subject matter of the first notification data; and
in response to confirming that it is permitted by the shared data model, allowing a second preferred service provider access, via the network, to the first notification data stored in the first customer profile.

9. The method of claim 8, wherein the configuration process further comprises:
- receiving one or more modifications from the first customer that modifies one or more data sharing permissions of the data sharing permissions; and
- modifying the shared data model so that the shared data model reflects the one or more modification to the one or more data sharing permissions;
- wherein the one or more modifications to the one or more data sharing permissions:
  - allows the second preferred service provider access to the first notification data stored in the first customer profile; and
  - disallows a third preferred service provider access to the first notification data stored in the first customer profile, wherein the third preferred service provider would have had access to the first notification data but for the one or more modification to the one or more data sharing permissions.

10. The method of claim 9, wherein the one or more modifications to the one or more data sharing permissions received from the first customer are received via a response mechanism activated by the first customer via the prompt.

11. A method related to customers orchestrating engagements with service providers, the method comprising the steps of:
- providing, by an independent facilitator entity, a customer journey orchestration service, wherein the customer journey orchestration service comprises:
  - service provider devices associated with a group of service providers affiliated with the customer journey orchestration service;
  - a virtual datacenter in which cloud-based applications and databases are operably linked to communication devices of the customers and to the group of affiliated services providers;
  - customer interface portals for enabling the customers to access and interact with the virtual datacenter, each of the customer interface portals being associated with a specific one of the customers and accessed thereby by a corresponding one of the communication devices; and
  - a customer profile database that stores customer profiles corresponding to respective ones of the customers;
- configuring, by the facilitator entity via a configuration process, an account of the customer for participation in the customer journey orchestration service, wherein the configuration process, when described in relation to a first customer of the customers and a first communication device that corresponds to the first customer, comprises:
  - providing a first customer interface portal accessible by the first customer via the first communication device;
  - creating a first customer profile in the customer profile database for storing customer data related to the first customer;
  - configuring the first customer interface portal so that an entirety of the customer data stored in the first customer profile database is accessible to the first customer so that the first customer is able to review the customer data and make modifications thereto;
  - receiving, from the first communication device via the first customer interface portal, customer data relating to the first customer, the customer data comprising: personally identifiable information relating to the first customer; selections made by the first customer of particular service providers from the group of the affiliated service providers as preferred service providers for affiliation with the account of the first customer;
  - customer journey data that includes interaction data taken from interactions occurring between the first customer and the preferred service providers in relation to past engagements with the preferred service providers; and
  - data sharing permissions provided by the first customer granting access rights to selected ones of the preferred providers that allows access to selected portions of the customer data in the first customer profile;
- creating a shared data model within the virtual datacenter based on the received data sharing permissions that delineates an accessible portion of the customer data in the first customer profile that each of the preferred service providers is allowed to access and a restricted portion of the customer data in the first customer profile that each of the preferred service providers is prevented to access;
- orchestrating, by the facilitator entity via the customer journey orchestration service, a current and ongoing one of the engagements (hereinafter "current engagement") that relates to at least a plurality of the preferred service providers, wherein the orchestrating, when described in relation to the first customer, comprises:
  - establishing, via a network, a communication channel between the first communication device of the first customer and a device associated with a first preferred service provider, wherein the communication channel facilitates the current engagement;
  - receiving, via the network, data related to a first notification (hereinafter "first notification data") from the device associated with the first preferred service provider, wherein the first notification data relates to the current engagement;
  - updating the customer journey data stored in the first customer profile in the customer profile database to include the first notification data; and
  - in response to confirming that it is permitted by the shared data model, allowing a second preferred service provider access, via the network, to the first notification data stored in the first customer profile;
- wherein the customer journey orchestration service further comprises a next best action service;
- further comprising deriving, by the facilitator entity via a recommendation process of the customer journey orchestration service, a recommended action for modifying the customer data stored in the first customer profile to improve a personalization level related to how one or more of the preferred service providers delivers a service to the first customer, wherein the recommendation process, when described in relation to the first customer, comprises:
  - receiving additional customer journey data related to one or more newly occurring interactions of the current engagement;
  - updating the customer journey data stored in the first customer profile to include the received additional customer journey data; and
  - generating the recommended action by applying a machine learning algorithm to the updated customer journey data to identify patterns therein correlating one or more input factors to one or more outcomes;

wherein the recommended action comprises a recommended modification to a specific data sharing permission of the data sharing permissions;

wherein the orchestrating further comprises:
sending a prompt, via the network, to the first communication device inquiring whether the first customer wants to modify the specific data sharing permission pursuant to the recommended modification;

receiving an approval, via the network, from the first communication device of the first customer approving the recommended modification to the specific data sharing permission; and in response to receiving the approval, modifying the shared data model in the virtual data center so that the shared data model reflects the recommended modification to a specific data sharing permission.

* * * * *